(12) United States Patent
Kawakami

(10) Patent No.: US 8,517,360 B2
(45) Date of Patent: Aug. 27, 2013

(54) CLAMP DEVICE

(75) Inventor: Takayuki Kawakami, Hyogo (JP)

(73) Assignee: Pascal Engineering Corporation, Hyogo (JP)

( * ) Notice: Subject to any disclaimer, the term of this patent is extended or adjusted under 35 U.S.C. 154(b) by 429 days.

(21) Appl. No.: 12/736,493

(22) PCT Filed: Apr. 3, 2009

(86) PCT No.: PCT/JP2009/001564
§ 371 (c)(1),
(2), (4) Date: Oct. 13, 2010

(87) PCT Pub. No.: WO2009/130854
PCT Pub. Date: Oct. 29, 2009

(65) Prior Publication Data
US 2011/0031670 A1 Feb. 10, 2011

(30) Foreign Application Priority Data

Apr. 24, 2008 (JP) ................. 2008-113450
Oct. 14, 2008 (JP) ................. 2008-265669

(51) Int. Cl.
B23Q 3/08 (2006.01)
B23Q 3/00 (2006.01)
B25B 3/00 (2006.01)
B25B 1/14 (2006.01)

(52) U.S. Cl.
USPC .............. 269/32; 269/20; 269/24; 269/25; 269/27; 269/28; 269/310; 269/228; 269/289 R; 269/309

(58) Field of Classification Search
USPC ......... 269/20, 24, 25, 27, 28, 32, 228, 289 R, 269/309–310
See application file for complete search history.

(56) References Cited

U.S. PATENT DOCUMENTS 6,095,509 A 8/2000 Yonezawa
6,378,855 B1 * 4/2002 Sawdon et al. ................. 269/32
6,988,720 B2 1/2006 Kawakami
(Continued)

FOREIGN PATENT DOCUMENTS

DE 40 20 981 1/1992
DE 10 2004 026 287 12/2005
(Continued)

OTHER PUBLICATIONS

U.S. Appl. No. 12/735,626, filed Aug. 3, 2010, Takayuki Kawakami.
U.S. Appl. No. 12/735,627, filed Aug. 3, 2010, Takayuki Kawakami.

Primary Examiner — Monica Carter
Assistant Examiner — Nirvana Deonauth
(74) Attorney, Agent, or Firm — Jordan and Hamburg LLP

(57) ABSTRACT

A clamp device includes a support mechanism that supports a grip member when expanding the diameter thereof, a clamping hydraulic cylinder that can drive the grip member and a clamp rod axially forwards and backwards (up and down), and a main body member to which the grip member, the clamp rod, the support mechanism, and the clamping hydraulic cylinder are mounted, with the grip member, the clamp rod, and the support mechanism being positioned at one end portion of the body member, and with the common axis of the grip member and the clamp rod being offset from the axis of the clamping hydraulic cylinder in a direction orthogonal to the clamp rod.

9 Claims, 12 Drawing Sheets

(56) References Cited

U.S. PATENT DOCUMENTS

| | | |
|---|---|---|
| 8,256,755 B2* | 9/2012 | Hiromatsu .................... 269/238 |
| 2005/0012258 A1* | 1/2005 | Migliori ......................... 269/32 |
| 2005/0017424 A1* | 1/2005 | Migliori ......................... 269/32 |
| 2005/0121846 A1 | 6/2005 | Kawakami |
| 2006/0049565 A1* | 3/2006 | Petit et al. ....................... 269/32 |
| 2009/0315239 A1 | 12/2009 | Yonezawa et al. |

FOREIGN PATENT DOCUMENTS

| | | |
|---|---|---|
| JP | 11-188551 | 7/1999 |
| JP | 2004-195583 | 7/2004 |
| JP | 3550010 | 8/2004 |
| JP | 3-106769 | 1/2005 |
| WO | WO-2007/060986 | 5/2007 |
| WO | WO-2007/074737 | 7/2007 |

\* cited by examiner

CLAMP DEVICE

TECHNICAL FIELD

The present invention relates to a clamp device, and in particular relates to a clamp device for clamping a workpiece by expanding the diameter of grip claw portions of a grip member in a hole in the workpiece to engage it, and by pulling it against a seating surface.

BACKGROUND TECHNOLOGY

When performing machine processing over the entire surface of a workpiece or around the entire external circumference thereof, a clamp device of the type described above (a so-called hole clamp) is employed, since it is not possible to employ a clamp device of the type that presses from above with a pressing tool on an edge portion of the workpiece. With such a clamp device, a seating surface or surfaces on which the workpiece is to be seated is formed at an upper end portion of a clamp main body that is shaped as a block, so as to surround a grip member; and when the workpiece is to be loaded: the workpiece is mounted on this seating surface and supported thereon; a grip claw portion of the grip member and a clamp rod having a taper shaft portion inserted through the grip member are inserted into a hole in the workpiece; and, after having made the grip claw portions expand in diameter with a taper shaft portion by pulling the clamp rod towards the seating surface, so that the grip claw portions engage with the inner circumferential surface of the hole, the workpiece is fixed against the seating surface by pulling this grip member further towards the seating surface with the clamp rod.

In Patent Documents #1 and #2, clamp devices of the abovementioned type are disclosed. In particular, with the clamp device described in Patent Document #1, in order to cope with variations in the position of the hole in the workpiece (i.e. manufacturing errors), the clamp rod having a taper shaft portion and a grip member, are adapted to be movable in directions orthogonal to the axis, so that thereby it is possible to perform reliable clamping, even if the position of the hole in the workpiece is deviated more or less from its proper original position.

Now, as with the clamp devices of Patent Documents #1 and #2, this type of clamp device has a grip member, a clamp rod, a hydraulic cylinder for clamping, and a clamp main body to which these elements are installed; and, normally, the clamping hydraulic cylinder is provided at a position in the vicinity of the center of the lower portion of the interior of the clamp main body which is shaped as a block, and the grip member and the clamp rod are arranged above the clamping hydraulic cylinder, with the grip member, the clamp rod, and the clamping hydraulic cylinder having the same common axis. Moreover, with the seating surface also being formed at the upper end of the clamp main body around the external circumference of the grip member, a clamping hydraulic cylinder of sufficient capacity may be employed.

Patent Document #1; Japanese Pat. No. 3,550,010 Publication

Patent Document #2; German Pat. No. 4,020,981 Publication

DISCLOSURE OF THE INVENTION

Problems to be Solved by the Invention

Now, as shown in FIG. 21, a workpiece 100 that is to be the object of clamping may, for example, have a flange portion 102 at the upper edge of a receptacle portion 101, and when, for example, performing a machining process on the upper surface of the flange portion 102 of the workpiece 100, the grip claw portion and the taper shaft portion of the clamp rod of the clamp device are inserted into a bolt hole 103 in this flange portion 102. However in the case of a clamp device such as a clamp device according to the prior art, in which the grip member projects for 10 to 30 mm from the central portion of the upper end of the clamp main body that is shaped as a block, it is impossible to clamp this workpiece 100 in any way, because the clamp main body and the receptacle portion 101 of the workpiece 100 interfere with one another.

Apart from a workpiece of the type described above, if a plurality of ribs are formed on a rear surface of a flange portion on which no machining process is to be performed in the vicinity of a bolt hole, then it is not possible to perform clamping with the clamp device of the prior art type if the gaps between the ribs are small, since it is not possible to position the clamp main body between one rib and another.

Objects of the present invention are to provide a clamp device that can perform clamping without causing the clamp main body to interfere with the workpiece, to increase the versatility of use of a clamp device, and so on.

Means to Solve the Problems

The present invention presents a clamping device having an annular grip member capable of expanding and contracting in a radial direction, of being inserted into a hole in a workpiece and of gripping an inner circumferential surface of the hole, and a clamp rod including a tapered shaft portion fitted into and engaged with the grip member, and is characterized by comprising: a support mechanism for supporting the grip member when a diameter of the grip member is expanded; a clamping fluid pressure cylinder capable of driving the grip member and the clamp rod forwards and backwards in the axial direction; and a main body member to which the grip member, the clamp rod, the support mechanism, and the clamping fluid pressure cylinder are installed; wherein the grip member, the clamp rod, and the support mechanism are positioned at one end portion of the main body member, with an axis of the grip member and the clamp rod being offset from an axis of the clamping fluid pressure cylinder in a direction orthogonal to the clamp rod.

When clamping a workpiece, in a state in which the workpiece is seated on the main body member and the grip member is supported by the support mechanism, the grip member is expanded in diameter by shifting the clamp rod to its retracted side with the clamping fluid pressure cylinder, and next, when the clamp rod and the grip member are driven to shift to their retracted sides by the clamping fluid pressure cylinder, the workpiece is fixed to the main body member.

Advantages of the Invention

According to the clamp device of the present invention, since the grip member, the clamp rod, and the support mechanism are provided at one end portion of the main body member, and an axis of the grip member and the clamp rod is offset from an axis of the clamping fluid pressure cylinder in the direction orthogonal to the clamp rod, accordingly, when clamping a hole in an external circumferential flange portion of a workpiece, it is possible to clamp the workpiece with a clamp device in a state which the vicinity of the one end of the main body member and the grip member, the clamp rod, and the support mechanism are arranged so as to correspond to the hole in the external circumferential flange portion.

In this case, by the greater portion of the main body member of the clamp device being positioned more to the outside than the contour of the workpiece, it is possible reliably to prevent interference between the main body member and portions other than the external circumferential flange portion of the workpiece. A workpiece may be clamped if it is a workpiece such as one having a receptacle portion that bulges downwards from the interior of an external circumferential flange portion; or a workpiece of a flat plate type can also be clamped in a similar manner to that in the case of a prior art type clamp device. In other words, this clamp device is capable of clamping workpieces of various shapes and structures, and is excellent from the point of view of versatility in use.

In addition to the structure of the present invention as described above, it would also be acceptable to employ various further structures, as follows.

(1) The grip member and the clamp rod may be adapted to be movable in a direction orthogonal to the clamp rod. According to this structure, even if there is some variation in the position of the hole in the workpiece due to error caused in manufacturing the hole, still it is possible to absorb this variation in the position of the hole by shifting the grip member and the clamp rod in some direction orthogonal to the clamp rod, and thus it is possible to perform clamping.

(2) The clamp device may comprise an L shaped link member formed L shape, that links together the clamp rod and a piston member of the clamping fluid pressure cylinder so as to move together. According to this structure, it is possible reliably to transmit the drive force of the clamping fluid pressure cylinder to the clamp rod.

(3) The support mechanism may comprise a support member including a support wall portion that supports a base end of the grip member and is pierced through by the clamp rod and a barrel wall portion extending from the support wall portion in a direction opposite to the grip member, and a supporting fluid pressure cylinder supporting the support member. According to this structure, it is possible to support the grip member with the supporting fluid pressure cylinder via the support member, and this results in a support mechanism of a simple structure.

(4) The supporting fluid pressure cylinder may comprise a cylinder bore formed in the main body member, a fluid chamber at one end portion of the cylinder bore, and a piston member that includes a piston portion that receives fluid pressure in the fluid chamber, and a piston rod that extends from the piston portion towards the grip member and is inserted into a vertical hole in the L shaped link member so as to be shiftable therein relatively thereto; and the support mechanism may comprise a pin member that is disposed in a vertically extending oval hole in the L shaped link member and abuts against a top end of the piston rod, and also abuts against a base end of the support member.

According to this structure, it is possible to support the support member by the supporting fluid pressure cylinder, via the pin member, so that, via the vertically extending oval hole, it is possible to separate the operation of the supporting fluid pressure cylinder and the operation of the clamping fluid pressure cylinder.

(5) The supporting fluid pressure cylinder may comprise a cylinder bore formed in the main body member, a fluid chamber at one end portion of the cylinder bore, and a piston member including a piston portion that receives fluid pressure in the fluid chamber, and a piston rod whose horizontal cross section is half circular or U shaped and that extends from the piston portion towards the grip member and supports the base end of the support member. According to this structure, it is possible to support the support member with the supporting fluid pressure cylinder via the piston rod of the piston member.

(6) The L shaped link member may comprise a lateral shaft portion that is formed integrally with the piston member of the clamping fluid pressure cylinder, and a vertical shaft portion that is coaxial with the grip member and the clamp rod and is fitted by screwing to an end portion of the lateral shaft portion; and the supporting fluid pressure cylinder may comprise a cylinder bore formed in the vertical shaft portion, a fluid chamber at one end portion of the cylinder bore, and a piston member including a piston portion that receives fluid pressure in the fluid chamber and a piston rod that extends from the piston portion towards the grip member and is inserted into a vertical hole of the vertical member so as to be shiftable relatively thereto; and the support mechanism may comprise a pin member that is disposed in a vertically extending oval hole in the vertical member and pierces through a top end portion of the piston rod of the supporting fluid pressure cylinder to contact against the base end of the support member. According to this structure, it is possible to support the support member with the supporting fluid pressure cylinder via the pin member.

(7) A cylindrical portion projecting for a predetermined length in the forward direction of the clamp rod may be formed in the one end portion of the main body member, with the grip member, the clamp rod, and the support member being installed to this cylindrical portion. According to this structure, it is possible to clamp the workpiece in a state in which the cylindrical portion is inserted into a space between one rib and another, or into a space like a cylindrical aperture of the workpiece, and accordingly the versatility is even more excellent.

(8) The support mechanism may comprise a support member supporting a base end of the grip member, and a supporting fluid pressure cylinder that supports the support member; and a clamping error detection means may be provided that detects clamping error during clamping operation of the clamping fluid pressure cylinder, by detecting abnormal dropping of a piston member of the supporting fluid pressure cylinder. According to this structure, it is possible to detect clamping error during clamping operation.

(9) The clamping error detection means may comprise: a sealing flange portion formed at an upper end portion of a piston portion of the piston member of the supporting fluid pressure cylinder; an air ejection outlet that opens in an opposing wall portion of the main body member that opposes the sealing flange portion, and an air passage that is formed in the main body member and is connected to the air ejection outlet; a pressurized air supply means that supplies pressurized air to the air passage; and an air pressure detection means that detects elevation of the pressure of pressurized air in the air passage. According to this structure, it is possible to implement the clamping error detection means with a simple structure so as to take notice of the fact that the piston member of the supporting fluid pressure cylinder drops abnormally during clamping error.

DESCRIPTION OF NUMERALS

Figure 1:
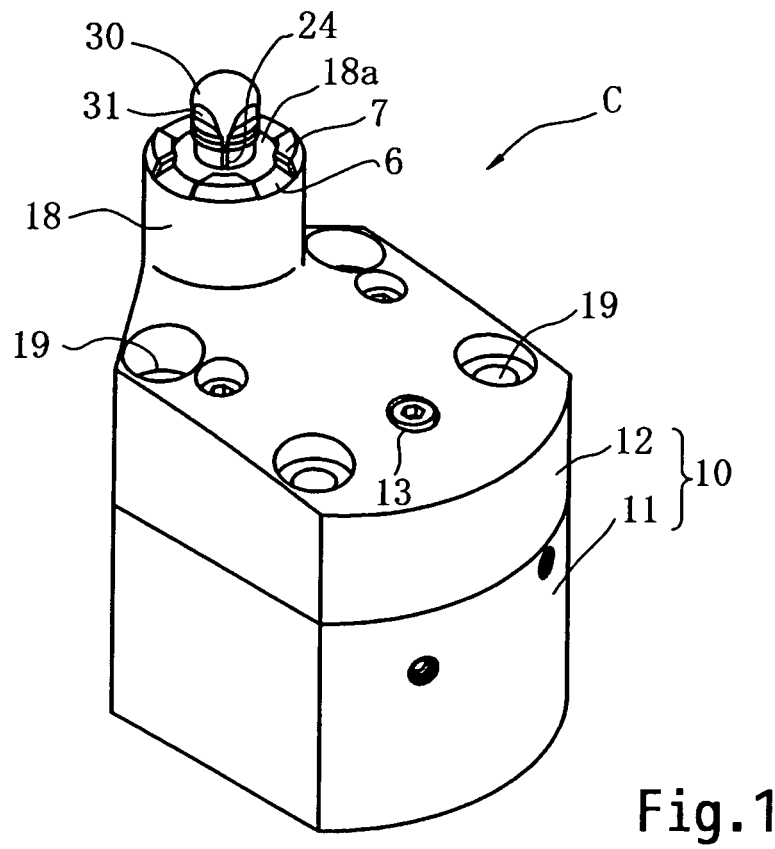
FIG. 1 is a perspective view of a clamp device of Embodiment 1 of the present invention.

C, Ca, CB: clamp device
10: main body member
18: cylindrical portion
20: grip member
30: clamp rod
31: tapered shaft portion
40, 40A, 40B: support mechanism
41: support member
41a: support wall portion
41b: barrel wall portion
42, 42A, 42B: supporting hydraulic cylinder
43: cylinder bore
44, 44B: supporting hydraulic chamber
45, 45a, 45b: piston member
45a, 45c, 45e: piston portion
45b, 45d, 45f: piston rod
45z: sealing flange portion
46, 46B: pin member
60, 60B: clamping hydraulic cylinder
80, 80A, 80B: L shaped link member
80a: horizontal member
87, 87B: oval hole
88: vertical shaft portion
90: clamping error detection means
91: air ejection outlet
92: air passage
92A: external air passage
93: pressurized air supply device
94: pressure switch

BEST MODE FOR IMPLEMENTING THE INVENTION

In the following, preferred embodiments for implementation of the present invention will be explained based on embodiments.

Embodiment 1

In the following, Embodiment 1 of the present invention will be explained based on the drawings. The present invention presents a clamp device of a type in which a grip claw portion of a grip member is engaged to clamp with a hole in a workpiece (i.e. "hole clamp").

As shown in FIGS. 1 to 5, this clamp device C comprises a main body member 10 to be a clamp main body, an annular grip member 20, a clamp rod 30 having a tapered shaft portion 31, a support mechanism 40, a clamping hydraulic cylinder 60, and so on. The grip member 20, the clamp rod 30, and the support mechanism 40 have a common vertical axis A.

The main body member 10 is for installing (attaching) the grip member 20, the clamp rod 30, the support mechanism 40, and the lamping hydraulic cylinder 60. This main body member 10 comprises a lower main body member 11 and an upper main body member 12 that is fixed on the lower main body member 11 by three bolts 13.

Figure 2:
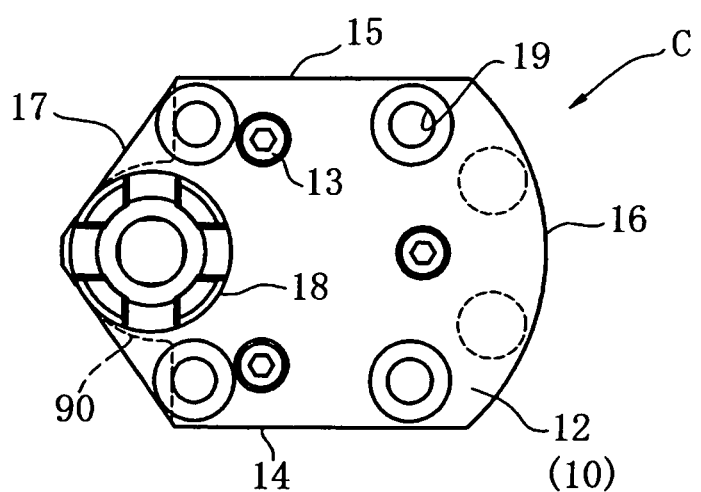
FIG. 2 is a plan view of the clamp device of FIG. 1.

In plan view, the main body member 10 has a shape that is close to that of a pentagon. As shown in FIG. 2 for reference, on the main body member 10, its front surface 14 and its rear surface 15 are formed as planes, its right side surface 16 is formed as part of a cylindrical surface, and its left side surface 17 is formed as two folded surfaces symmetrical front and back, with the angle between these folded surfaces being, for example, 110°. A cylindrical portion 18 projecting upwards is formed at a portion in the vicinity of the left end (i.e. left end portion) of the upper end portion of the upper main body member 12, and, in the plan view shown in FIG. 2, the left side surface 17 (the folded surface) nearly circumscribes the cylindrical portion 18 in plan view. Four bolt holes 19 are formed in the main body member 10 for fixing the clamp device C to a fixing base member.

As shown in FIGS. 2 to 5, the grip member 20, the clamp rod 30, and the support mechanism 40 are provided at a portion in the vicinity of the left end (i.e. left end portion) of the main body member 10, and the grip member 20, clamp rod 30, and a support member 41 of support mechanism 40 are installed concentrically in the interior of the cylindrical portion 18. The clamping hydraulic cylinder 60 is for driving the grip member 20 and the clamp rod 30 forwards and backwards (i.e. up and down) in the axial direction (i.e. the vertical direction), and is provided in the interior of the lower portion of the central portion of the main body member 10. Due to this, the common axis A of the grip member 20 and the clamp rod 30 is offset by just a predetermined distance from the axis B of the clamping hydraulic cylinder 60 in the direction orthogonal to the clamp rod 30. The clamping hydraulic cylinder 60 will be described later.

Figure 8:
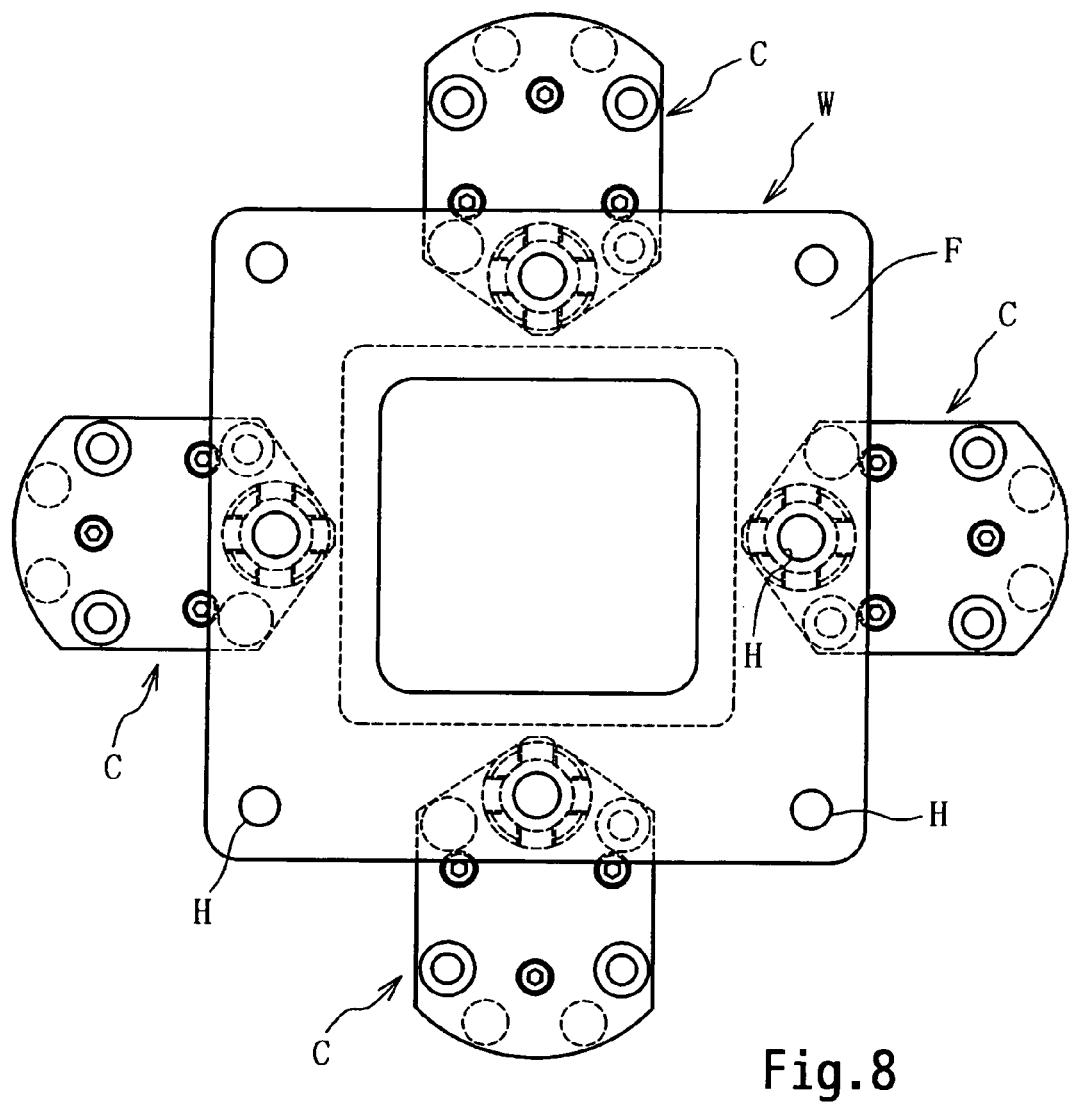
FIG. 8 is a plan view of four clamp devices and a workpiece.

As shown in FIGS. 2 to 5, the grip member 20 comprises annular grip claw portions 21 that can be inserted into a hole H in a workpiece W and can grip the inner circumferential surface of the hole H, a tubular portion 22 extending from the lower end portion of this grip claw portion 21, and a lower end flange portion 23 that continues from the lower end of the tubular portion 22 (refer to FIG. 8). The grip member 20 is divided into four equal grip divided elements in the circumferential direction by four slits 24 (refer to FIG. 1), so that it can expand or contract in the radial direction. Multi-stepped claws are formed on the grip claw portion 21. An upper tapered aperture 25 and a lower cylindrical aperture 26 are formed in the grip member 20. The horizontal cross sectional shape of the tapered aperture 25 is square.

The clamp rod 30 comprises the tapered shaft portion 31 that is fitted in the interior of the tapered aperture 25 and increases in diameter upwards, an upper shaft portion 32 that extends downward from the lower end of the tapered shaft portion 31 and is fitted in the interior of the cylindrical aperture 26, a lower shaft portion 33 that extends downward from the upper shaft portion 32 and is of somewhat larger diameter than the upper shaft portion 32, and a flange shaped lower end engagement portion 34 that extends from the lower end of the lower shaft portion 33. The horizontal cross sectional shape of the tapered shaft portion 31 is approximately quare.

The grip member 20 and the clamp rod 30 are passed through an aperture 18a in the top wall of the cylindrical portion 18, and the upper portion of the grip member 20 and the upper end portion of the clamp rod 30 project more upwards than the top wall of the cylindrical portion 18. At the top wall of the cylindrical portion 18, an elastic annular scraper 9 made from synthetic resin is fitted over the exterior of the grip member 20, and an O-ring 8 is fitted over the grip member 20 for reducing its diameter. Four seating surfaces 7 for seating the workpiece W and four air grooves 6 for allowing the flow of air ejected from the aperture 18a to blow out are formed on the upper surface portion of the top wall of the cylindrical portion 18.

Figure 3:
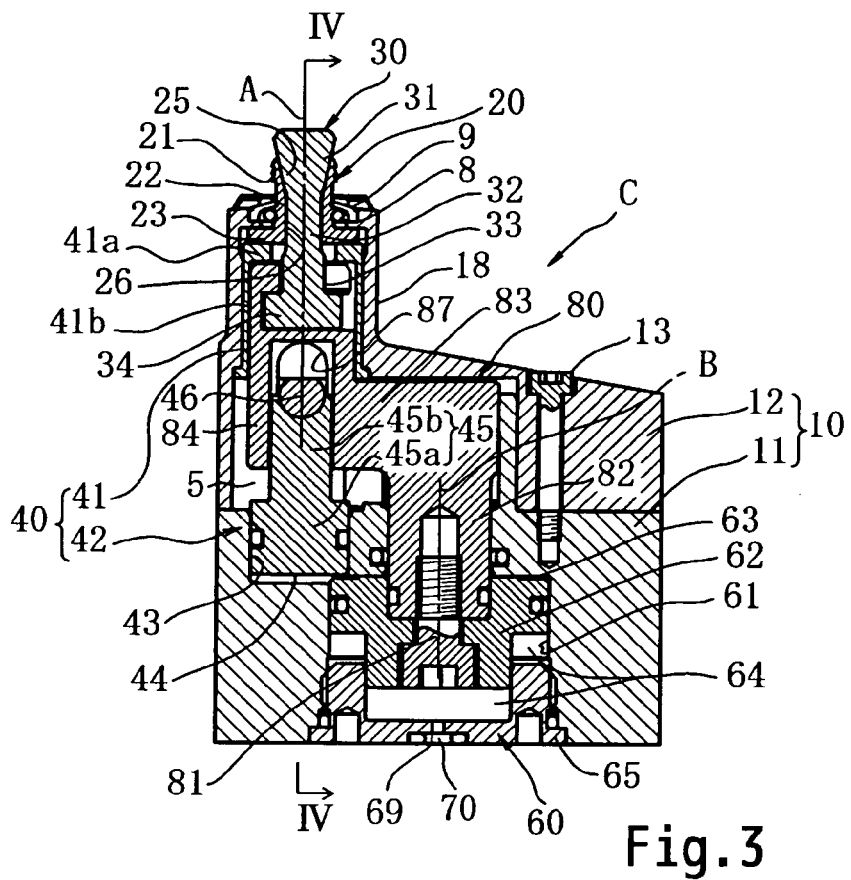
FIG. 3 is a vertical sectional view of the clamp device of FIG. 1.
Figure 4:
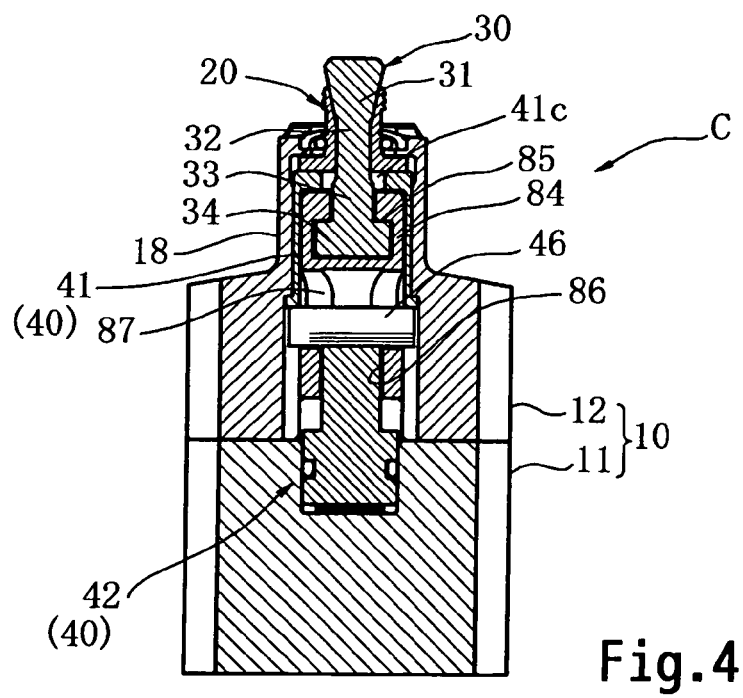
FIG. 4 is a sectional view along IV-IV line of FIG. 3.
Figure 5:
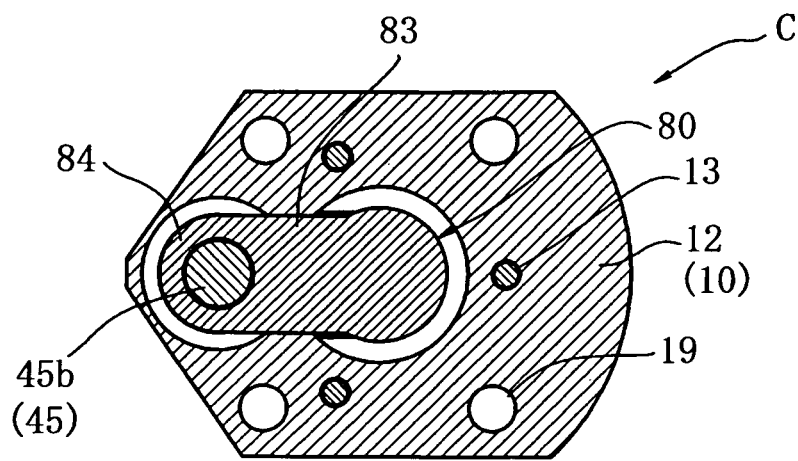
FIG. 5 is a horizontal sectional view of the clamp device of FIG. 1.

Next, the support mechanism 40, the clamping hydraulic cylinder 60, and an L shaped link member 80 will be explained. As shown in FIGS. 3 to 5, the support mechanism 40 is for supporting the grip member 20 when the grip member 20 is expanded in diameter. The support mechanism 40 comprises a support member 41 and a supporting hydraulic cylinder 42 that supports the support member 41.

The support member 41 comprises a circular support wall portion 41a that supports the lower surface (i.e. the base end surface) of the lower end flange portion 23 of the grip member 20, and a barrel wall portion 41b that extends in the opposite direction to the grip member 20 (i.e. downwards) from the support wall portion 41a. A through hole 41c is formed to pass through the support wall portion 41a, of an appropriate shape for the clamp rod 30 to pass through with some play. The through hole 41c is formed so that, when the clamp device C is being assembled, the tapered shaft portion 31 of the clamp rod 30 can also pass through it. The barrel wall portion 41b is installed within the cylindrical portion 18 so as to be capable of vertical movement therein.

As shown in FIGS. 3 to 5, provided is an L shaped link member 80 for linking the clamp rod 30 and a piston member 62 of the clamping hydraulic cylinder 60 so as to drive together. This L shaped link member 80 comprises a first vertical shaft portion 82 that is fixed by a bolt 81 to the piston member 62 of the clamping hydraulic cylinder 60, a lateral shaft portion 83 that extends horizontally from the upper end portion of the first vertical shaft portion 82, and a second vertical shaft portion 84 that extends upwards from the end portion of the lateral shaft portion 83. This second vertical shaft portion has a common axis with the axis A, and the upper portion of the second vertical shaft portion 84 is fitted into the barrel wall portion 41b of the support member 41 so as to slide up and down freely therein. A horizontal T groove 85 having inverted T shape is formed in the upper end portion of the second vertical shaft portion 84, and the lower end engagement portion 34 of the clamp rod 30 is engaged into the T groove 85. In this manner, the clamp rod 30 and the L shaped link member 80 are capable of shifting up and down integrally.

A gap of about 1 to 2 mm is defined between the lower engagement portion 34 of the clamp rod 30 and vertical wall surfaces of the T groove 85, a gap is also defined at the external circumference of the lower end flange portion 23 of the grip member 20, and a gap is also defined between the clamp rod 30 and the vertical wall surface of the through hole 41c. For this reason, the structure makes it possible for the grip member 20 and the clamp rod 30 to shift, relatively to the cylindrical portion 18 of the main body member 10, by about 1 to 2 mm in all horizontal directions orthogonal to the clamp rod 30. Thus clamping is still possible, even if the position of the hole H formed in the workpiece W varies somewhat due to manufacturing error.

The supporting hydraulic cylinder 42 comprises a cylinder bore 43 that is formed in the main body member 10, a hydraulic chamber 44 at one end portion of this cylinder bore 43, and a piston member 45 that comprises a piston portion 45a that receives the hydraulic pressure in the hydraulic chamber 44 and a piston rod 45b that extends towards the grip member 20 from the piston portion 45a and is inserted into a vertical hole 86 in the second vertical shaft portion 84 so as to be shiftable relatively thereto.

The support mechanism 40 comprises a pin member 46 that is oriented horizontally for transmitting the support force of the supporting hydraulic cylinder 42 to the support member 41. The central portion of the pin member 46 in its longitudinal direction is contacted against the upper end of the piston rod 45b, and the portions near the two ends of the pin member 46 are located in vertically extending oval holes 87 in the second vertical shaft portion 84, so that both these end portions of the pin member 46 are contacted from below against the base end (i.e. the lower end) of the support member 41.

Since the hydraulic chamber 44 is communicated with a clamping hydraulic chamber 63 of the clamping hydraulic cylinder 60, accordingly, during clamping, hydraulic pressure (pressurized oil) is also supplied to this hydraulic chamber 44, and initially in the clamping operation the support member 41 and the grip member 20 are kept in their upper limit positions by the piston member 45, via the pin member 46.

As shown in FIG. 3, the clamping hydraulic cylinder 60 comprises a cylinder bore 61 that is formed within the main body member 10, a piston member 62 that is installed in the cylinder bore 61, the hydraulic chamber 63 above the piston member 62, a hydraulic chamber 64 for clamp release below the piston member 62, and a closing member 65 that closes the lower end of the hydraulic chamber for clamp release 64. The first vertical shaft portion 82 of the L shaped link member 80 is positioned coaxially with the clamping hydraulic cylinder 60, and is linked integrally with its piston member 62. The closing member 65 is engaged with the main body member 10 by being screwed thereinto.

Figure 7:
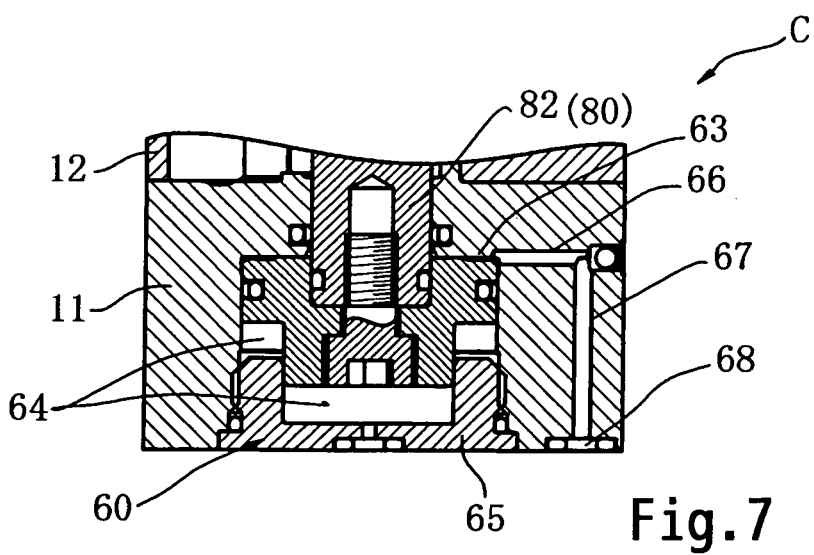
FIG. 7 is a vertical sectional view of a lower portion of the clamp device of FIG. 1.

As shown in FIG. 7, hydraulic passages 66, 67 and a hydraulic pressure supply port 68 are formed in the main body member 10 in order to supply hydraulic pressure (pressurized oil) into the clamping hydraulic chamber 63 and the hydraulic chamber 44 of the supporting hydraulic cylinder 42, and the hydraulic pressure supply port 68 is connected to a hydraulic pressure supply source via hydraulic passages or hoses. A hydraulic passage 69 and a hydraulic pressure supply port 70 are formed in the closing member 65 in order to supply hydraulic pressure (pressurized oil) to the hydraulic chamber 64, and this hydraulic pressure supply port 70 is connected to a hydraulic pressure supply source via hydraulic conduits or hoses.

Figure 6:
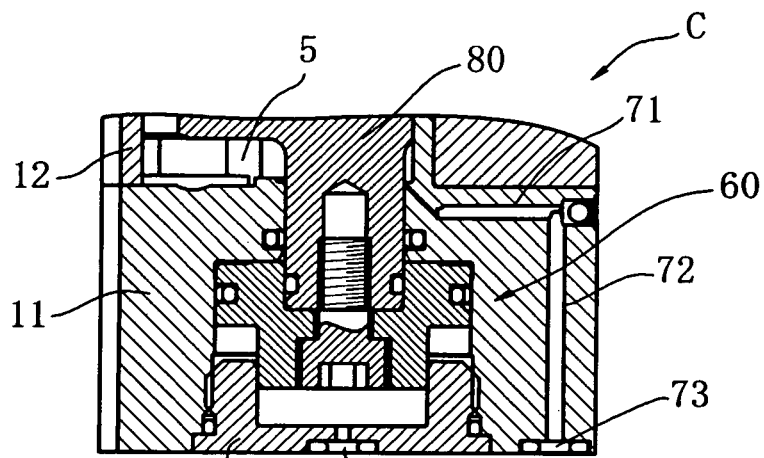
FIG. 6 is a vertical sectional view of a lower portion of the clamp device of FIG. 1.

As shown in FIG. 6, air passages 71, 72 and an air supply port 73 are formed in the main body member 10 in order to supply pressurized air for blowing air against the periphery of the grip member 20, and this air supply port 73 is connected to a pressurized air supply source via air conduits or hoses.

Pressurized air is supplied from the air passage 71 to an internal space 5 within which the L shaped link member 80 is contained, and this pressurized air flows to the interior of the cylindrical portion 18 and is ejected into the gap between the grip member 20 and the clamp rod 30, the slits 24 dividing the grip member 20, and the gap at the external circumferential surface of the grip member 20, thereby cleaning the area around the grip member 20 by blowing air thereonto.

In order to detect seating of the workpiece W on the four seating surfaces 7, an air nozzle is formed in one of the seating surfaces 7, and an air supply system that supplies pressurized air to this air nozzle and a pressure switch that detects the air pressure of the air passage extending from the air supply source are also provided.

Next, the operation of fixing a workpiece with the clamp device C, and the advantages will be explained.

Figure 9:
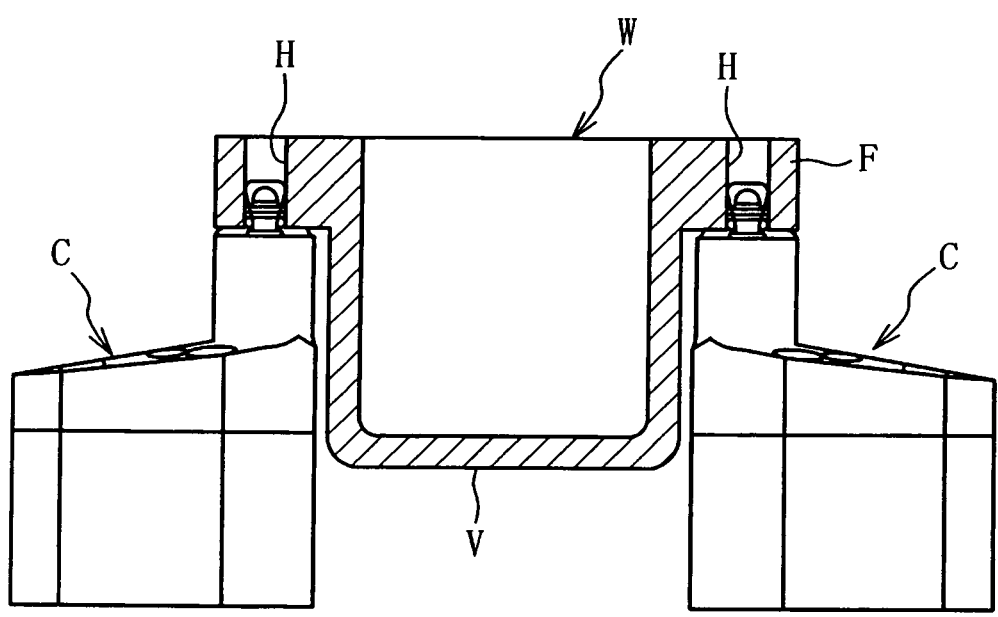
FIG. 9 is a vertical view of the clamp devices and the workpiece of FIG. 8.
Figure 10:
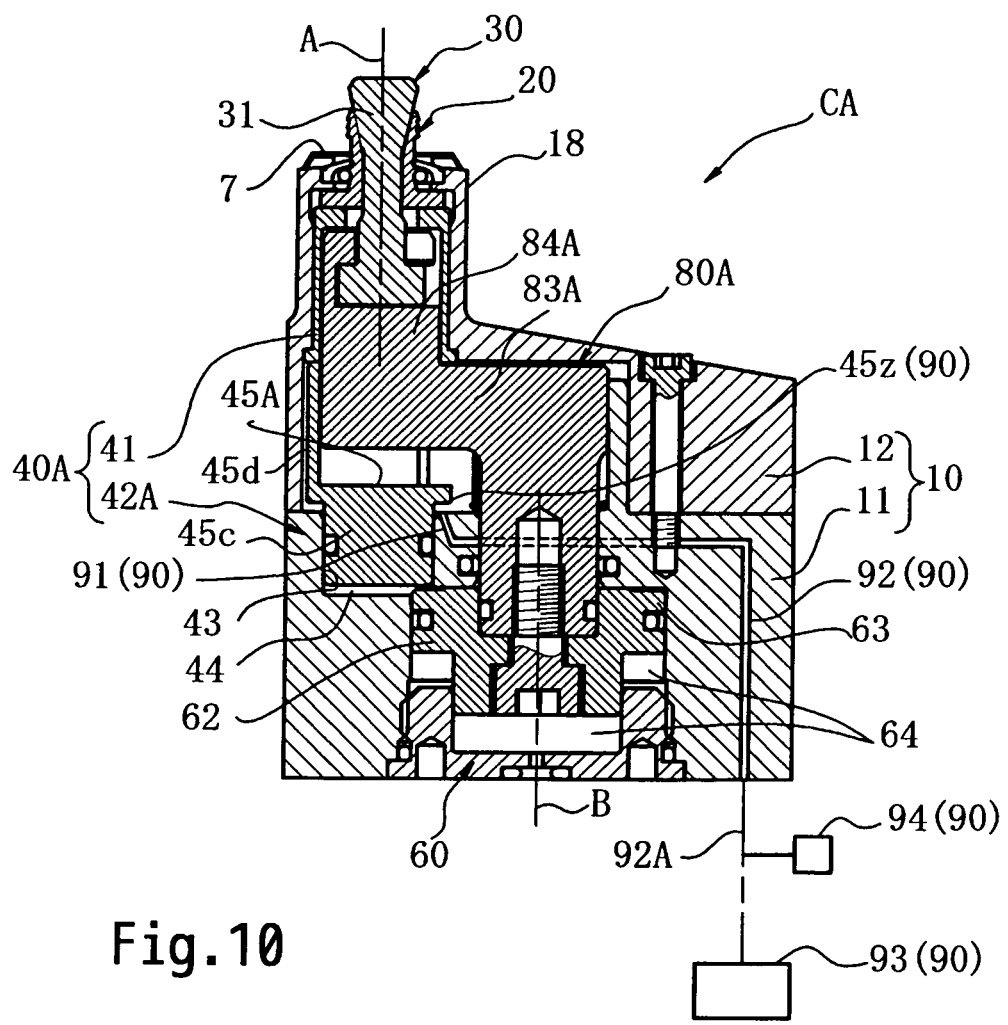
FIG. 10 is a figure corresponding to FIG. 3 for a clamp device of Embodiment 2.

As shown in FIGS. 8, 9, with this embodiment, a workpiece W made from metal has a receptacle main body portion V that is quite deep, a flange portion F formed at the upper end of this receptacle main body portion V, and a plurality of bolt holes H that are formed on the flange portion F. Four clamp devices C that correspond to these four bolt holes H are arranged as shown in the figure, and their grip members 20 and clamp rods 30 are inserted into the bolt holes H respectively, so that, after having gripped the inner circumferential surfaces of the bolt holes H, the workpiece W may be fixed by clamp driving these grip members 20 and clamp rods 30 downwards.

The clamp devices C have excellent adaptability to a multiplicity of uses, since they can be clamped up after the cylindrical portions 18 near the one ends of their main body members 10 have been positioned underneath the flange portion F as shown in the figure. It should be understood that it is also possible to fix a workpiece that is formed as a flat plate with these clamp devices C, in a similar manner to the case with prior art clamp devices.

The operation during clamping with the clamp device C will now be explained. Initially, along with supplying hydraulic pressure of a predetermined pressure level from the hydraulic pressure supply port 68 to the clamping hydraulic chamber 63 and the supporting hydraulic chamber 44, hydraulic pressure is also supplied from the hydraulic pressure supply port 70 to the hydraulic chamber 64, so that the piston member 62 is shifted upwards, and the L shaped link member 80 is raised to its upper limit position and the clamp rod 30 is also held in its upper limit position.

Since when this is done, hydraulic pressure is supplied to the hydraulic chamber 44 of the supporting hydraulic cylinder 42, accordingly the piston member 45 is shifted upwards, and the grip member 20 is held in its upper limit position by the support mechanism 40. Due to this, the grip member 20 is put into its diameter reduced state, since the taper shaft portion 31 of the clamp rod 30 is positioned upwards relatively to the tapered aperture 25. In this state, the workpiece W is mounted on the seating surfaces 7 from above, and the grip claw portion 21 and the tapered shaft portion 31 are inserted into the bolt hole H of the workpiece W.

Next, the hydraulic pressure in the hydraulic chamber for clamp release 64 is drained after having been reduced. When this is done, first, the clamp rod 30 is slightly lowered relatively to the grip member 20 because the piston member 62 starts to drop, and the grip claw portion 21 expands in diameter due to the tapered shaft portion 31 so as to grip the inner circumferential surface of the bolt hole H in the workpiece W.

Just after this, since the hydraulic pressure (pressurized oil) in the hydraulic chamber 64 is drained and the hydraulic force in the downward direction that acts on the piston member 62 becomes to be three times of the hydraulic force in the upward direction that acts on the piston member 45, accordingly the grip member 20 and the clamp rod 30 are driven downwards via the L shaped link member 80 for clamping, and the workpiece W is strongly fixed to the seating surfaces 7. The workpiece W is accordingly in the state of being clamped by the four clamp devices C, so that the upper surface of the flange portion F of the workpiece W can be subjected to machining process. When this machining process is completed, in a similar manner to that described above, the grip member 20 is changed over to its diameter reduced state, the grip member 20 and the clamp rod 30 are changed over to their upper limit positions, and similar clamping to that described above is performed for the next workpiece.

When assembling this clamp device C, before assembling the upper main body member portion 12, the clamping hydraulic cylinder 60, the supporting hydraulic cylinder 42, the L shaped link member 80 are assembled, and, in the state in which the support member 41 is not assembled, the lower end engagement portion 34 of the clamp rod 30 is engaged from the side into the T groove 85, and next the support member 41 is assembled from above and the grip member 20 and the O-ring 8 are assembled to the clamp rod 30, and next the upper main body member 12 is assembled, and the three bolts 13 are fastened.

Since, according to this clamp device C, the grip member 20, the clamp rod 30, and the support mechanism 40 are provided at a portion in the vicinity of one end (i.e. one end portion) of the main body member 10, and since the common axis A of the grip member 20 and the clamp rod 30 is offset by a predetermined distance in the horizontal direction from the axis B of the clamping hydraulic cylinder 60, accordingly, as shown in FIGS. 8, 9, it is possible to clamp the workpiece W by disposing the clamp device C so that only this vicinity of the one end of the main body member 10 corresponds to the hole H in the workpiece W, thus avoiding any interference between the main body member 10 and the workpiece W.

In particular, since the cylindrical portion 18 is formed to project upwards at a portion in the vicinity of the one end (i.e. one end portion) of the main body member 10, and since the grip member 20, the clamp rod 30, and the support mechanism 40 are installed coaxially with this cylindrical portion 18, accordingly, in a case such as when a plurality of ribs whose heights are lower than the height of the cylindrical portion 18 are formed on the flange portion F of the workpiece W, it is possible to clamp the workpiece W with an arrangement in which the cylindrical portions 18 are inserted between the plurality of ribs. It should be understood that a workpiece shaped as a flat plate can be clamped in a similar manner to the case with prior art clamp devices.

Since in this structure it is arranged for the grip member 20 and the clamp rod 30 to be movable in the directions orthogonal to the clamp rod 30, accordingly, even if due to error in manufacturing the hole H in the workpiece W there is some variation in the position of the hole H, still it is possible to absorb variation in the position of the hole H by shifting the grip member 20 and the clamp rod 30 in the direction orthogonal to the clamp rod 30, and thus it is possible to perform clamping in a reliable manner.

Since the L shaped link member 80 is provided that links the clamp rod 30 and the piston member 62 of the clamping hydraulic cylinder 60 so as to move together, accordingly it is possible to transmit the drive force of the clamping hydraulic cylinder 60 to the clamp rod 30 in a reliable manner. And it is possible to support the grip member 20 with the supporting hydraulic cylinder 42 via the support member 41, so that a support mechanism 40 having a simple construction is provided.

The support member 41 can be supported by the supporting hydraulic cylinder 42 via the pin member 46, and accordingly it is possible to separate and mutually isolate the operation of the supporting hydraulic cylinder 42 and the operation of the clamping hydraulic cylinder 60, via the vertically oriented oval holes 87 described above. And it is possible to simplify the structure of the hydraulic passages, since the hydraulic chambers 44, 63 are communicated together. Furthermore it becomes possible for the L shaped link member 80 to move smoothly up and down, since the second vertical shaft portion 84 of the L shaped link member 80 is guided in the vertical direction by the piston member 45.

Embodiment 2

As shown in FIGS. 10 to 15, since a support mechanism 40A that is different from that of Embodiment 1 is provided to this clamp device CA, principally this support mechanism 40A will be explained, while the same reference symbols will be affixed to structural elements that are the same as ones in Embodiment 1, with the explanation thereof being omitted.

The supporting hydraulic cylinder 42A comprises a cylinder bore 43 formed in the main body member 10, a hydraulic chamber 44 at one end portion of the cylinder bore 43, and a piston member 45A that receives the hydraulic pressure in this hydraulic chamber 44. The piston member 45A comprises a piston portion 45c and a piston rod 45d, whose horizontal section is half circular or U shaped, which extends from this piston portion 45c towards the grip member 20 and supports the base end (i.e. the lower end) of the support member 41. The piston rod 45d is engaged to the outer surface of the lower portion of the second vertical shaft portion 84A of the L shaped link member 80A, so as to slide freely in the vertical direction.

Next, the clamping error detection means 90 will be explained.

A sealing flange portion 45z is formed at the upper end portion of the piston portion 45c of the piston member 45A of the supporting hydraulic cylinder 42A. A very thin air ejection outlet 91 is formed at the opposing wall portion of the lower main body member 11 so as to face the aseling flange portion 45z from below, and an air passage 92 communicating with the air ejection outlet 91 is formed within the lower main body member 11. This air passage 92 is connected by an external air conduit 92A to a pressurized air supply device 93, and a pressure switch 94 is connected to the external air passage 92A.

Figure 11:
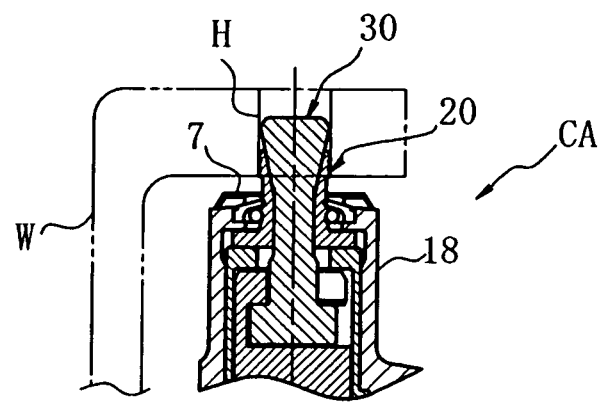
FIG. 11 is a sectional explanatory view of an essential portions of an example in which a clamping error has occurred.

As shown in FIG. 11, when a workpiece W is set in an improperly seated state in which it has risen up somewhat from the seating surfaces 7 and the clamping hydraulic cylinder 60 has been operated, even though the grip claw portion 21 of the grip member 20 grips the inner circumferential surface of the hole H in the workpiece W, together with the dropping of the piston member 62 of the clamping hydraulic cylinder 60, the piston member 45A of the supporting hydraulic cylinder 42A drops abnormally, and an imperfectly clamped state results when the piston member 45A has dropped as far as its lower limit position. Since as a result the sealing flange portion 45z closes the air ejection outlet 91, the air pressure in the air passages 92 and 92A rises. Since this pressure rise is detected by the pressure switch 94, it is possible to detect of the clamping error.

And, if the workpiece W is set in a state in which it is seated normally and the clamping hydraulic cylinder 60 is operated, then the state in which the grip claw portion 21 grips the inner circumferential surface of the hole H in the workpiece is established, and, since further downward shifting of the workpiece W is prevented by the seating surfaces 7, accordingly air continues to be ejected from the air ejection outlet 91 because the air ejection outlet 91 is not closed by the sealing flange portion 45z of the piston portion 45c, so that the air pressure in the air passages 92 and 92A does not rise since this air leaks out to the exterior from the gap between the periphery of the L shaped link member 80A and the periphery of the clamp rod 30.

Figure 12:
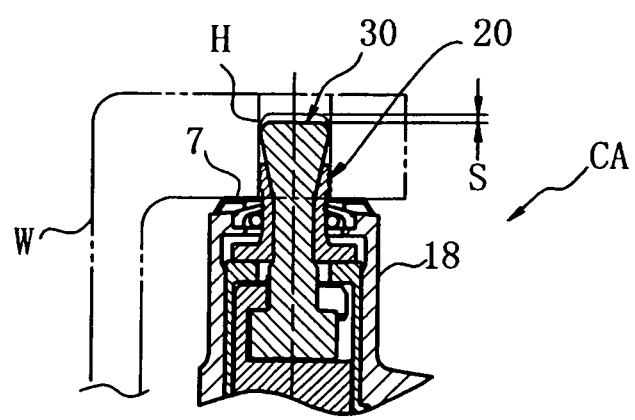
FIG. 12 is a sectional explanatory view of an essential portions of an example in which another different clamping error has occurred.
Figure 13:
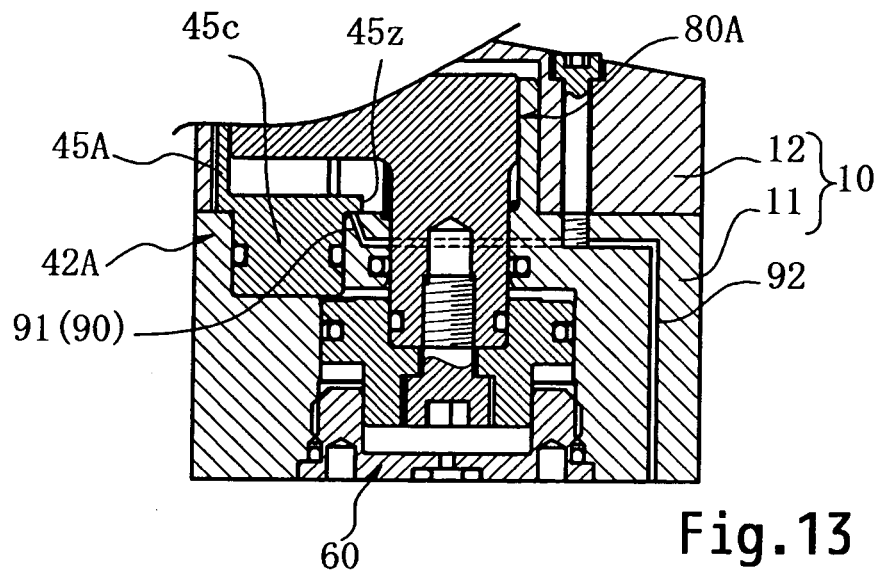
FIG. 13 is a sectional view showing an essential portion of a situation in which an air ejection outlet is closed by a sealing flange member of a piston portion of a supporting hydraulic cylinder.
Figure 14:
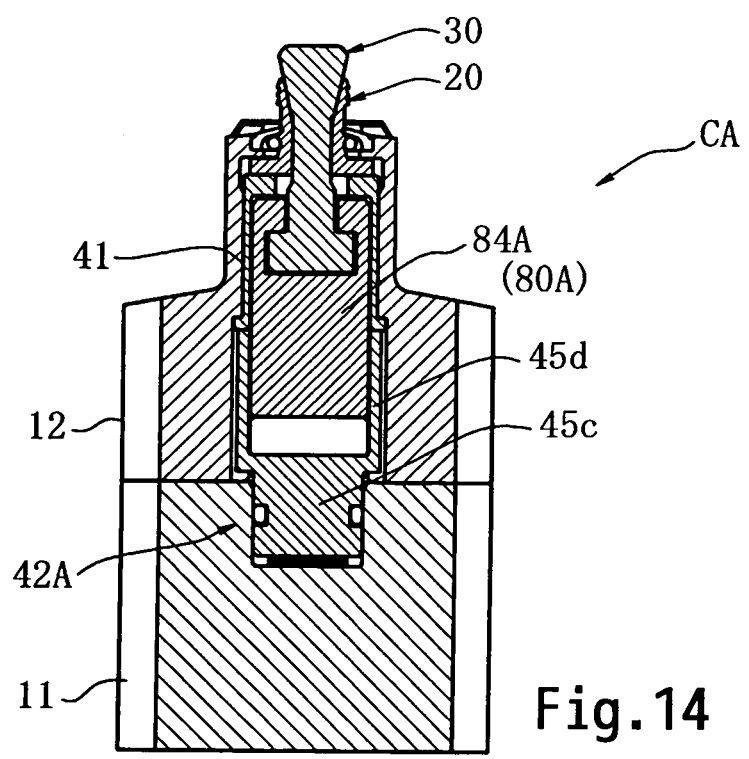
FIG. 14 is a figure corresponding to FIG. 4 for the clamp device of FIG. 10.
Figure 15:
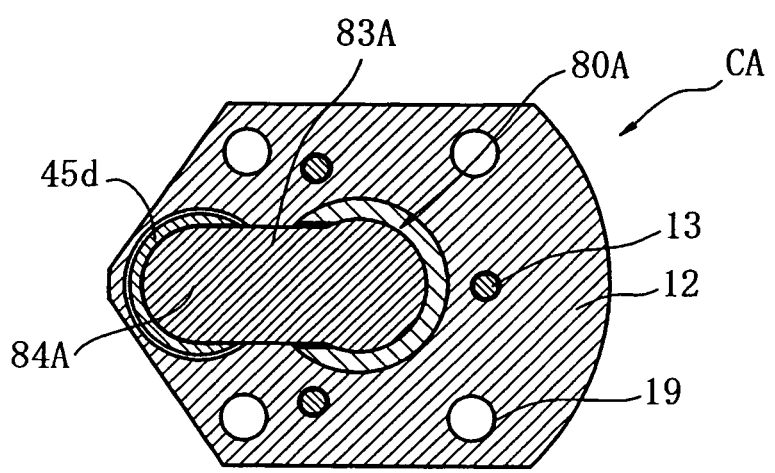
FIG. 15 is a figure corresponding to FIG. 5 for the clamp device of FIG. 10.
Figure 16:
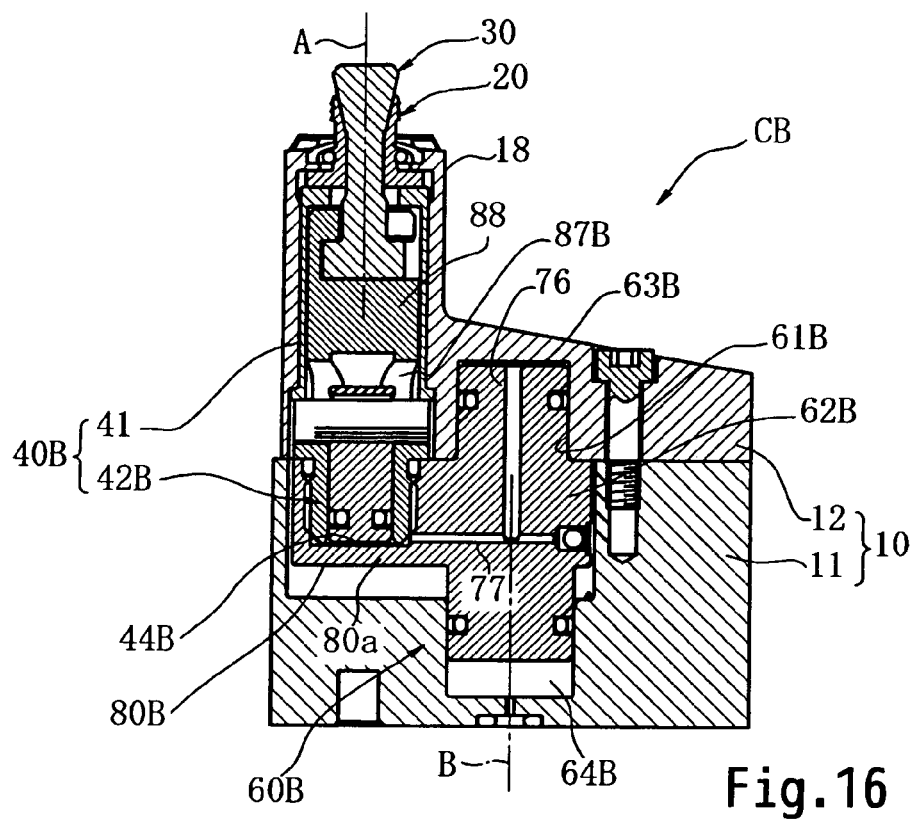
FIG. 16 is a figure corresponding to FIG. 3 for a clamp device of Embodiment 3.
Figure 17:
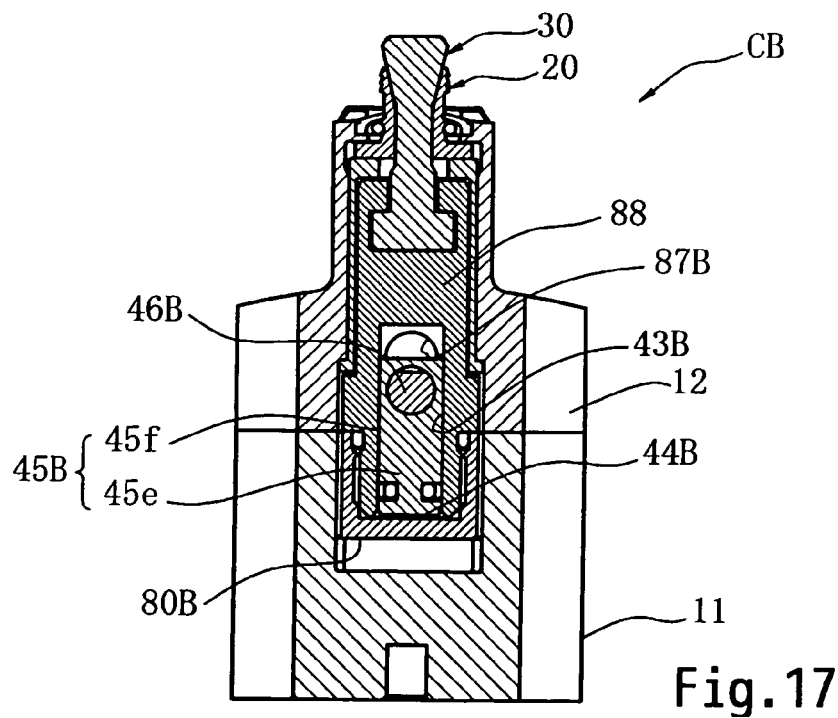
FIG. 17 is a figure corresponding to FIG. 4 for the clamp device of FIG. 13.
Figure 18:
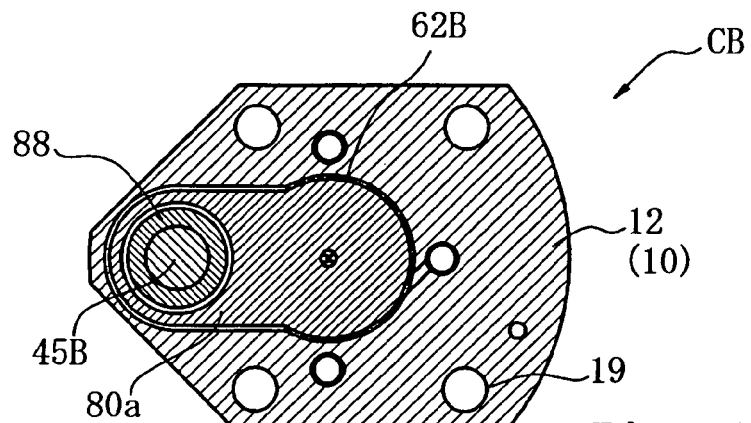
FIG. 18 is a figure corresponding to FIG. 5 for the clamp device of FIG. 13.
Figure 19:
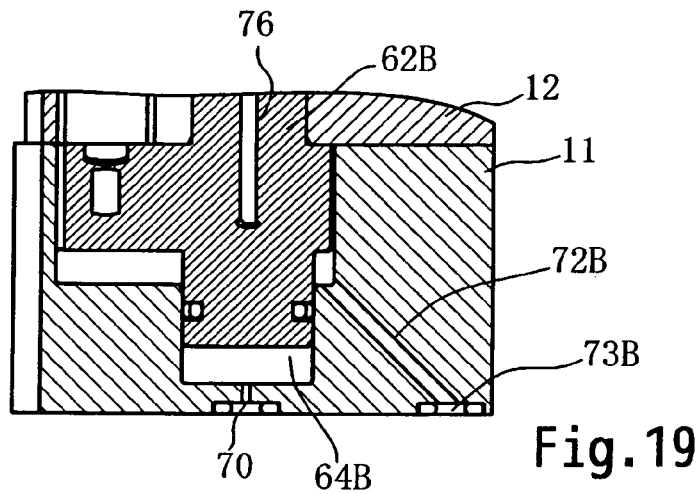
FIG. 19 is a figure corresponding to FIG. 6 for the clamp device of FIG. 13.
Figure 20:
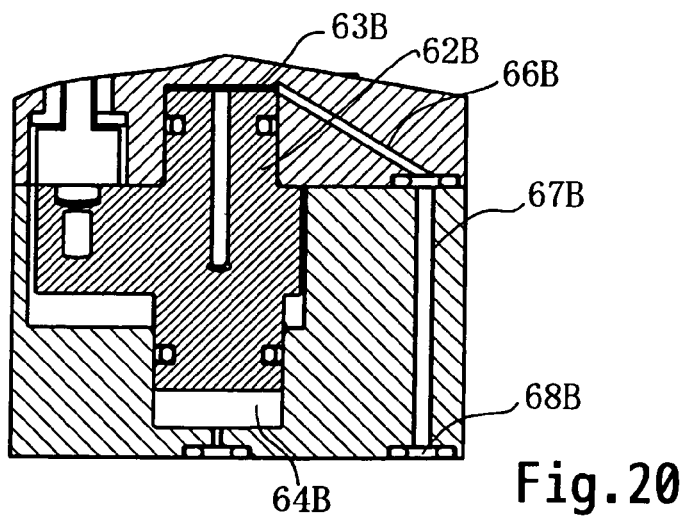
FIG. 20 is a figure corresponding to FIG. 7 for the clamp device of FIG. 13.
Figure 21:
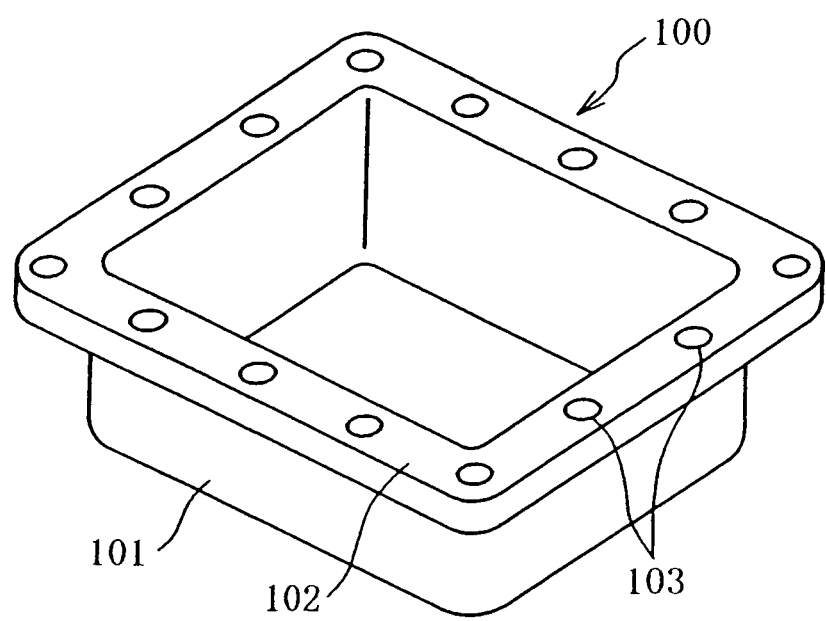
FIG. 21 is a perspective view of a workpiece according to a prior art.

As shown in FIG. 12, if the workpiece W is in a state in which it is seated normally on the seating surfaces 7 and the hydraulic cylinder 60 is operated, then, if the grip claw por clamping tion 21 slips only a small distance S with respect to the inner circumferential surface of the hole H, in a similar manner to the case shown in FIG. 11, the piston member 45a of the supporting hydraulic cylinder 42A drops abnormally, it is possible to detect this clamping error with the clamping error detection means 90 described above, since the air ejection outlet 91 is blocked.

Furthermore, although this is not shown in the figures, even if the grip claw portion 21 cannot grip the inner circumferential surface of the hole H in the workpiece W in a normal manner because the hole H is too large, then it is still possible to detect this clamping error with the clamping error detection means 90 described above.

Since the other operations and the advantages of the clamp device CA are almost the same as those of the clamp device C of Embodiment 1, explanation thereof will be omitted. However, with this clamp device CA, it is possible to simplify the construction of the support mechanism 40 and the construction of the L shaped link member 80A, and this is advantageous in manufacturing this device.

Embodiment 3

As shown in FIGS. 16 to 20, since a support mechanism 40B and an L shaped link member 80B and a clamping hydraulic cylinder 60B that are different from those of Embodiments 1, 2 are provided in this clamp device CB, principally this support mechanism 40B, this L shaped link member 80B, and the clamping hydraulic cylinder 60B will be explained, while the same reference symbols will be affixed to structural elements that are the same as those in Embodiments 1, 2, with the explanation thereof being omitted.

This clamping hydraulic cylinder 60B comprises a cylinder bore 61B, a piston member 62B installed in the cylinder bore 61B, a clamping hydraulic chamber 63B at the upper end portion of the cylinder bore 61B, and a hydraulic chamber for clamp release 64B at the lower end portion of the cylinder bore 61B. Hydraulic passages 66B, 67B and a hydraulic pressure supply port 68B are provided for supplying hydraulic pressure to the clamping hydraulic chamber 63B, and this hydraulic pressure supply port 68B is connected to a hydraulic pressure supply source. And hydraulic passages 76, 77 are formed in the piston member 62B and communicate the clamping hydraulic chamber 63B with the hydraulic chamber 44B of the supporting hydraulic cylinder 42B. An air supply port 73B and an air passage 72B are also provided.

The L shaped link member 80B comprises a 80a that is integral with the piston member 62B of the clamping hydraulic cylinder 60B, and a vertical member 88 that is coaxial with the grip member 20 and the clamp rod 30 and that is screwed to the end portion of the lateral shaft portion 80a. And the supporting hydraulic cylinder 42B comprises a cylinder bore 43B that is formed in the vertical member 88, a hydraulic chamber 44B at one end portion of this cylinder bore 43B, and a piston member 45B including a piston portion 45e that receives the hydraulic pressure in this hydraulic chamber 44B and a piston rod 45f that extends from this piston portion 45e towards the grip member 20 and is inserted into the cylinder bore 43B so as to be relatively shiftable therein.

A horizontal pin member 46B is provided that transmits the support force of the supporting hydraulic cylinder 42B to the support member 41. The central portion of the pin member 46B pierces through a portion in the vicinity of the end of the piston rod 45d. The portions of the pin member 46B in the vicinity of its ends are located in a vertical oval holes 87B of the vertical member 88. The two end portions of the pin member 46B contact against the base end of the support member 41 (i.e. its lower end) from below. Explanation of the operation of this clamp device CB is omitted, since it is almost identical to that of the clamp device C of Embodiment 1.

Next, modified examples in which the above embodiments are partially varied will be explained.

[1] Instead of the hydraulic cylinders 42, 42A, 42B, 60, and 62B, it would also be acceptable to provide air cylinders that operate with pressurized air.

[2] It would also be possible to install a similar device to the abnormality detection means 90 of Embodiment 2 to the clamp device of Embodiment 1.

[3] There is no reason for the shape of the left end portion of the main body member 10 to be limited to that of the Embodiment 1; for example, it would also be acceptable to form it with a structure of a shape such as that shown in FIG. 2 by the broken line 90.

[4] These clamp devices C, CA, and CB are not only limited to clamping holes in the flange portion of a workpiece; they can also clamp through holes formed in a workpiece or blind holes or the like.

INDUSTRIAL APPLICABILITY

The present invention may be applied to a clamp device of the type in which a grip claw portion of a grip member is engaged to clamp into a hole in a workpiece.

The invention claimed is:

1. A clamp device having an annular grip member capable of expanding and contracting in a radial direction, of being inserted into a hole in a workpiece and of gripping an inner circumferential surface of the hole, and a clamp rod including a tapered shaft portion fitted into and engaged with the grip member, comprising: a support mechanism for supporting the grip member when a diameter of the grip member is expanded; a clamping fluid pressure cylinder capable of driving the grip member and the clamp rod forwards and backwards in the axial direction; and a main body member to which the grip member, the clamp rod, the support mechanism, and the clamping fluid pressure cylinder are installed; wherein the grip member, the clamp rod, and the support mechanism are positioned laterally at one end portion of the main body member in a horizontal direction, with a vertical axis of the grip member and the clamp rod, which is parallel with a vertical axis of the clamping fluid pressure cylinder, being offset from the vertical axis of the clamping fluid pressure cylinder in a horizontal direction orthogonal to the clamp rod; wherein the grip member and the clamp rod are adapted to be movable in the horizontal direction orthogonal to the clamp rod; and further comprising an L shaped link member formed like L shape, that links together the clamp rod and a piston member of the clamping fluid pressure cylinder so as to move together.

2. The clamp device according to claim 1, wherein the support mechanism comprises a support member including a support wall portion supporting a base end of the grip member and being pierced through by the clamp rod and a barrel wall portion extending from the support wall portion in a direction opposite to the grip member, and a supporting fluid pressure cylinder for supporting the support member.

3. The clamp device according to claim 2, wherein the supporting fluid pressure cylinder comprises a cylinder bore formed in the main body member, a fluid chamber at one end portion of the cylinder bore, and a piston member that includes a piston portion that receives fluid pressure in the fluid chamber, and a piston rod that extends from the piston portion towards the grip member and is inserted into a vertical cylindrical hole in the L shaped link member so as to be shiftable therein relatively thereto; and wherein the support mechanism comprises a horizontal pin member that penetrates the vertical cylindrical hole, and a pair of vertically extending oval holes formed in the L shaped link member, a midway portion of the horizontal pin member abutting against a top end of the piston rod, and both end portions of the horizontal pin member abutting against a base end of the support member.

4. The clamp device according to claim 2, wherein the supporting fluid pressure cylinder comprises a cylinder bore formed in the main body member, a fluid chamber at one end portion of the cylinder bore, and a piston member including a piston portion that receives fluid pressure in the fluid chamber, and a piston rod whose horizontal cross section is half circular or U shaped and that extends from the piston portion towards the grip member and supports the base end of the support member.

5. A clamp device having an annular grip member capable of expanding and contracting in a radial direction, of being inserted into a hole in a workpiece and of gripping an inner circumferential surface of the hole, and a clamp rod including a tapered shaft portion fitted into and engaged with the grip member, comprising:
a support mechanism for supporting the grip member when a diameter of the grip member is expanded;
a clamping fluid pressure cylinder capable of driving the grip member and the clamp rod forwards and backwards in the axial direction;
a main body member to which the grip member, the clamp rod, the support mechanism, and the clamping fluid pressure cylinder are installed; and
an L shaped link member formed like L shape, that links together the clamp rod and a piston member of the clamping fluid pressure cylinder so as to move together;
wherein the grip member, the clamp rod, and the support mechanism are positioned at one end portion of the main body member, with an axis of the grip member and the clamp rod being offset from an axis of the clamping fluid pressure cylinder in a direction orthogonal to the clamp rod;
wherein the support mechanism comprises a support member including a support wall portion supporting a base end of the grip member and being pierced through by the clamp rod and a barrel wall portion extending from the support wall portion in a direction opposite to the grip member, and a supporting fluid pressure cylinder for supporting the support member;

wherein the L shaped link member comprises a lateral shaft portion that is formed integrally with the piston member of the clamping fluid pressure cylinder, and a vertical shaft portion that is coaxial with the grip member and the clamp rod and is fitted by screwing to an end portion of the lateral shaft portion; wherein the supporting fluid pressure cylinder comprises a cylinder bore formed in the vertical shaft portion, a fluid chamber at one end portion of the cylinder bore, and a piston member including a piston portion that receives fluid pressure in the fluid chamber and a piston rod that extends from the piston portion towards the grip member and is inserted into a vertical hole of the vertical member so as to be shiftable relatively thereto; and wherein the support mechanism comprises a pin member that is disposed in a vertically extending oval hole in the vertical member and pierces through a top end portion of the piston rod of the supporting fluid pressure cylinder to contact against the base end of the support member.

6. The clamp device according to claim 2, wherein a cylindrical portion projecting for a predetermined length in the forward direction of the clamp rod is formed in the one end portion of the main body member, with the grip member, the clamp rod, and the support member being installed to this cylindrical portion.

7. A clamp device having an annular grip member capable of expanding and contracting in a radial direction, of being inserted into a hole in a workpiece and of gripping an inner circumferential surface of the hole, and a clamp rod including a tapered shaft portion fitted into and engaged with the grip member, comprising: a support mechanism for supporting the grip member when a diameter of the grip member is expanded;

a clamping fluid pressure cylinder capable of driving the grip member and the clamp rod forwards and backwards in the axial direction; and a main body member to which the grip member, the clamp rod, the support mechanism, and the clamping fluid pressure cylinder are installed;

wherein the grip member, the clamp rod, and the support mechanism are positioned at one end portion of the main body member, with an axis of the grip member and the clamp rod being offset from an axis of the clamping fluid pressure cylinder in a direction orthogonal to the clamp rod;

wherein the support mechanism comprises a support member supporting a base end of the grip member, and a supporting fluid pressure cylinder that supports the support member; and wherein a clamping error detection means is provided that detects clamping error during clamping operation of the clamping fluid pressure cylinder, by detecting abnormal dropping of a piston member of the supporting fluid pressure cylinder.

8. The clamp device according to claim 7, wherein the clamping error detection means comprises:

a sealing flange portion formed at an upper end portion of a piston portion of the piston member of the supporting fluid pressure cylinder;

an air ejection outlet that opens in an opposing wall portion of the main body member that opposes the sealing flange portion from below, and an air passage that is formed in the main body member and is connected to the air ejection outlet;

a pressurized air supply means that supplies pressurized air to the air passage; and an air pressure detection means that detects elevation of the pressure of pressurized air in the air passage.

9. A clamp device having an annular grip member capable of expanding and contracting in a radial direction, of being inserted into a hole in a workpiece and of gripping an inner circumferential surface of the hole, and a clamp rod including a tapered shaft portion fitted into and engaged with the grip member, comprising:

a support mechanism for supporting the grip member when a diameter of the grip member is expanded;

a clamping fluid pressure cylinder capable of driving the grip member and the clamp rod forwards and backwards in the axial direction;

a main body member to which the grip member, the clamp rod, the support mechanism, and the clamping fluid pressure cylinder are installed; and an L shaped link member formed like L shape, that links together the clamp rod and a piston member of the clamping fluid pressure cylinder so as to move together; and wherein the grip member, the clamp rod, and the support mechanism are positioned at one end portion of the main body member, with an axis of the grip member and the clamp rod being offset from an axis of the clamping fluid pressure cylinder in a direction orthogonal to the clamp rod;

wherein the grip member and the clamp rod are adapted to be movable in a direction orthogonal to the clamp rod; wherein the support mechanism comprises a support member including a support wall portion supporting a base end of the grip member and being pierced through by the clamp rod and a barrel wall portion extending from the support wall portion in a direction opposite to the grip member, and a supporting fluid pressure cylinder for supporting the support member; and wherein the L shaped link member comprises a lateral shaft portion that is formed integrally with the piston member of the clamping fluid pressure cylinder, and a vertical shaft portion that is coaxial with the grip member and the clamp rod and is fitted by screwing to an end portion of the lateral shaft portion; and the supporting fluid pressure cylinder comprises a cylinder bore formed in the vertical shaft portion, a fluid chamber at one end portion of the cylinder bore, and a piston member including a piston portion that receives fluid pressure in the fluid chamber and a piston rod that extends from the piston portion towards the grip member and is inserted into a vertical hole of the vertical member so as to be shiftable relatively thereto; and the support mechanism comprises a pin member that is disposed in a vertically extending oval hole in the vertical member and pierces through a top end portion of the piston rod of the supporting fluid pressure cylinder to contact against the base end of the support member.

* * * * *